May 4, 1954　　　　　R. H. WISE　　　　　2,677,155
WINDSHIELD DEFROSTER
Filed Nov. 29, 1950　　　　　　　　　　　　2 Sheets-Sheet 1
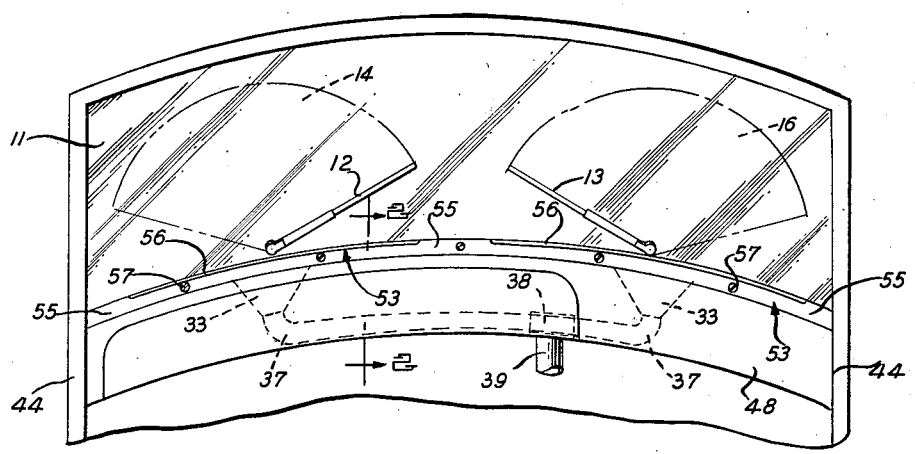
Fig. 1.
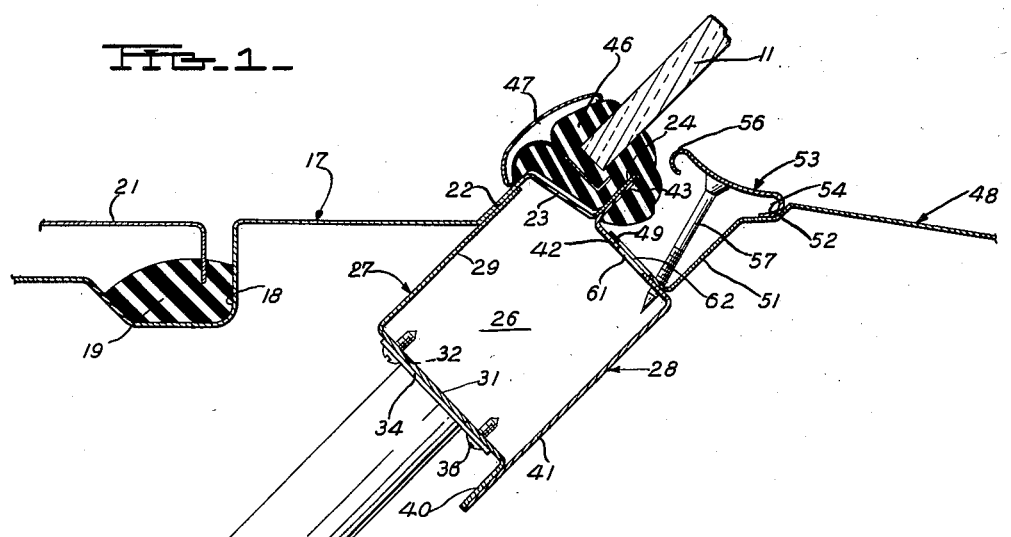
Fig. 2.
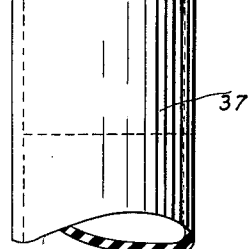
RALPH H. WISE
INVENTOR.
BY E.C. McRae
J. R. Faulkner
G. H. Oster
ATTORNEYS May 4, 1954 R. H. WISE 2,677,155
WINDSHIELD DEFROSTER
Filed Nov. 29, 1950 2 Sheets-Sheet 2

RALPH H. WISE
INVENTOR.

BY E. C. McRae
J. R. Faulkner
D. H. Oster
ATTORNEYS

Patented May 4, 1954

2,677,155

UNITED STATES PATENT OFFICE 2,677,155

WINDSHIELD DEFROSTER

Ralph H. Wise, Wayne, Mich., assignor to Ford Motor Company, Dearborn, Mich., a corporation of Delaware Application November 29, 1950, Serial No. 198,171

3 Claims. (Cl. 20—40.5)

This invention relates generally to a motor vehicle body construction and has particular reference to a cowl construction incorporating a hollow duct for distributing heated defrosting air over the interior surface of the windshield.

An object of the present invention is to provide a cowl construction for a motor vehicle body incorporating a hollow duct extending transversely of the body directly beneath the windshield and forming a strong structural part of the body as well as providing a distribution chamber for defrosting air from the vehicle heater or defroster heater. A plurality of spaced openings are formed in the upper portion of the duct and are arranged in two groups with each group being located directly beneath one of the zones of the windshield cleaned by a windshield wiper blade. A further object of the invention is to so arrange the openings in the duct as to obtain uniform distribution of heated defrosting air over the cleaned zones of the windshield in the most efficient manner. The duct is structurally joined to the cowl panel and also to the instrument panel of the vehicle body, and a suitable molding is mounted between the windshield and the instrument panel, the molding being spaced from the windshield in laterally spaced zones to assist in directing the air emerging from the duct directly onto the lower portions of the windshield.

Other objects and advantages of the present invention will be made more apparent as this description proceeds, particularly when considered in connection with the accompanied drawings, wherein:

Figure 1 is a semi-diagrammatic elevational view of the windshield and instrument panel of a motor vehicle body incorporating the present invention, as viewed from the interior of the body.

Figure 2 is an enlarged cross-sectional view taken on the line 2—2 of Figure 1.

Figure 3:
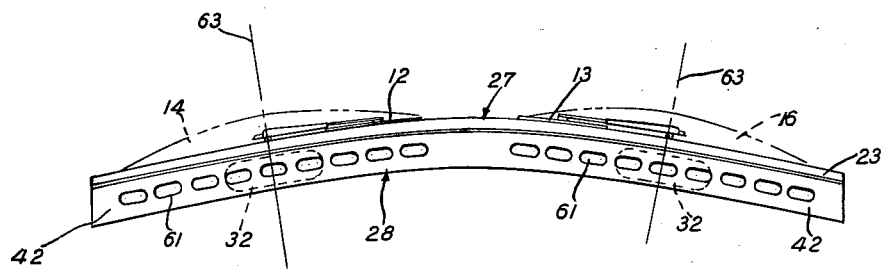
Figure 3 is a plan view of the cowl bar construction shown on Figures 1 and 2, with the instrument panel, windshield garnish molding, and windshield weather strip removed.

Referring now to the drawings, the reference character 11 indicates the windshield of a motor vehicle, the windshield being shown as of the one piece curved type. A pair of windshield wiper blades 12 and 13 are oscillated by a conventional windshield wiper motor (not shown) and clean zones 14 and 16 respectively of the exterior surface of the windshield.

With reference now particularly to Figure 2, the reference character 17 indicates the cowl panel of the vehicle body, the forward portion of the panel having a depressed laterally extending groove 18 for receiving a resilient weather strip 19 adapted to form a seal with the rearward portion 21 of the vehicle hood. At its rearward end the cowl panel 17 is successively formed with an upwardly inclined portion 22, a downwardly inclined portion 23 and an upwardly inclined marginal flange 24. The portions 22, 23 and 24 are formed substantially at right angles to each other.

Cooperating with the cowl panel 17 is a cowl bar 26 comprising a forward section 27 and a rearward section 28. The upper flange of the forward section 27 of the cowl bar is secured to the upwardly inclined intermediate portion 22 of the cowl panel by any suitable means, such as by welding. The lower flange 31 of the forward section 27 of the cowl bar extends at right angles to the upper flange 29 and is provided with an elongated laterally extending opening 32 directly beneath the center of each of the cleaned zones 14 and 16 of the windshield. Secured to the under side of the lower flange 31 in alignment with each inlet opening 32 is a flared inlet tube 33, the upper flange 34 of which is secured to the cowl bar by fastening elements 36. As seen in Figure 1, flexible conduits 37 are attached to the lower portions of the inlet tubes 33, and are joined by a T connection 38 to a flexible defroster tube 39 extending from the defroster of the conventional vehicle heater (not shown) or from a separate defroster heater as the case may be.

The forward section 27 of the cowl bar is provided with a lower marginal flange 40 adapted to be secured as by welding to the lower edge of the lower flange 41 of the rearward section 28 of the cowl bar. The rearward section 28 is also formed with an upper flange 42 extending forwardly and upwardly at right angles from the lower flange 41 and terminating in an upwardly and rearwardly extending marginal flange 43, the latter being secured as by welding to the upper marginal flange 24 of the front cowl bar section 27.

It will be apparent from the foregoing that the two sections 27 and 28 of the cowl bar cooperate with the cowl panel 17 to form an enclosed box-shaped duct extending transversely of the vehicle body beneath the lower edge of the windshield 11. Because of its configuration and arrangement, the cowl bar forms an important structural part of the body construction, the opposite ends of the cowl bar being secured to the adjacent body pillars 44 and closed thereby.

As shown in Figure 2, a resilient weather strip 46 of conventional type embraces the lower edge of the windshield 11 and also the portions 22, 23, 24 and 43 of the cowl panel and cowl bar construction to mount the windshield thereon and to form a tight joint therebetween. A decorative trim strip 47 is secured to the exterior side of the weather strip 46.

An instrument panel 48 extends generally rearwardly from the upper portion of the cowl bar 26 and is provided with a forward marginal flange 49 secured as by welding to the upper flange 42 of the rearward section 28 of the cowl bar. An intermediate portion 51 of the instrument panel 48 extends upwardly and rearwardly generally parallel to the windshield 11 and is connected by a depressed portion 52 to the main portion of the instrument panel. It will be seen that the instrument panel at its forward end thus cooperates with the cowl bar and the windshield to form a chamber extending transversely across the vehicle body adjacent the lower edge of the windshield. The upper portion of this chamber is substantially closed by means of a garnish molding 53 the rearward rolled edge 54 of which is seated in the depressed portion 52 of the instrument panel. The forward edge of the garnish molding 53 contacts the windshield and the weather strip 46 in three spaced zones 55 located at each edge portion and also centrally of the windshield. Intermediate the contacting portions 55, the garnish molding 53 is formed with a rolled edge 56 spaced rearwardly a short distance of the windshield 11 to form an opening therebetween. Upon reference to Figure 1 it will be noted that the slots thus formed between the molding 53 and the windshield are located beneath the cleaned zones 14 and 16 of the windshield. Screws 57 secure the garnish molding 53 in place, the screws extending into tapped holes formed in the flanges 42 and 49 of the cowl bar and instrument panel respectively.

Referring now to Figure 2, it will be seen that the upper flange 42 of the rearward cowl bar section 28 is formed with a series of slots or outlet openings 61, and that the forward marginal flange 49 of the instrument panel 48 is similarly formed with slots 62. The slots 62 in the instrument panel are slightly larger than the slots 61 in the cowl bar and are in alignment therewith. Referring now to Figure 3, it will be seen that slots 61 in the cowl bar are formed in two groups with each group being located within the lateral confines of one of the cleaned zones 14 and 16 of the windshield 11. In the embodiment shown in Figure 3, the slots 61 are all of equal size and are equally spaced from each other.

It will be apparent that the cowl bar construction of the present invention forms not only a rigid and strong structural part of the vehicle body but also provides an efficient distribution means for directing heated defrosting air onto the windshield. A heater is selected having the required output of heated defrosting air both in airflow and B. t. u. content, and the air is directed through the defroster hose 38 and 37 to the defroster inlets 33 and then through the openings 32 into the interior of the cowl bar. Inasmuch as the duct formed by the cowl panel and cowl bar extends the entire width of the vehicle body, the duct is completely charged with heated air under pressure. This air is ejected from the duct through the openings 61 in the cowl bar into the elongated chamber formed by the windshield, instrument panel and garnish molding and from there is directed onto the windshield through the slots provided between the windshield and the edges 56 of the garnish molding. The size, location and spacing of the outlet openings 61 in the cowl bar are such that the air is uniformly distributed over the cleaned areas 14 and 16 of the windshield in order to properly defrost the latter.

Various modifications of the invention are contemplated. For example, in lieu of the two defroster inlets 33 located beneath the two cleaned areas 14 and 16 of the windshield, a single defroster inlet could be used and located either centrally of the windshield or at any other desired location. In addition, while the instrument panel 48 and the garnish molding 53 cooperate in directing the air from the outlet openings 61 onto the windshield, this particular arrangement could be altered and the air ejected from the cowl bar openings directly onto the interior surface of the windshield. Furthermore, the sizes and spacing of the outlet openings in the cowl bar can be arranged in various manners in order to achieve the optimum performance under the particular conditions existing.

Figure 4:
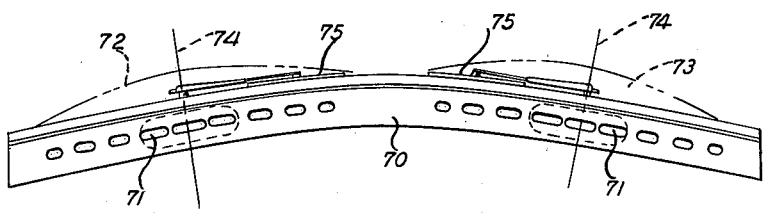
Figures 4 and 5 are elevational views similar to Figure 3 but showing modified forms thereof.

In Figure 4 there is shown a modified cowl bar 70 having outlet openings 71 provided therein and arranged in two groups located adjacent the cleaned areas 72 and 73 of the windshield. In this embodiment, however, it will be noted that the openings 71 are not uniform in size but progressively vary from a large size immediately adjacent the oscillation axis 74 of the windshield wiper blade 75 to relatively small openings at each end of each group. In addition, the openings 71 are spaced closer together nearer the axis 74. The increased area adjacent the windshield wiper axis provides a greater air flow in the longer central portions of the cleaned areas of the windshield and insures the proper rise of the heated air along the exterior surface of the windshield throughout the entire extent of the cleaned areas.

Figure 5:
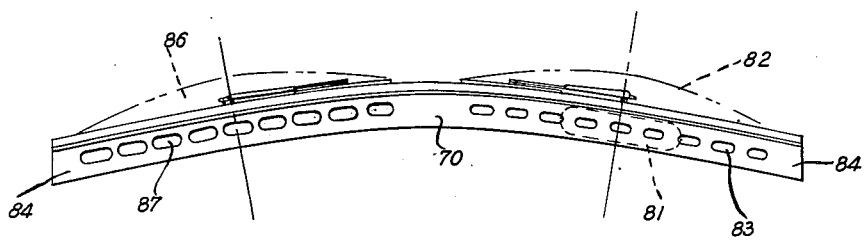

The modification shown in Figure 5 utilizes but one defroster inlet 81 located beneath the cleaned area 82. Openings 83 are formed in the cowl bar 84 beneath the area 82. To insure an adequate flow of air to the cleaned area 86 on the opposite side of the windshield somewhat larger openings 87 are provided in the cowl bar in alignment therewith.

It will be understood that the invention is not to be limited to the exact consruction shown and described, but that various changes and modifications may be made without departing from the spirit and scope of the invention, as defined in the appended claims.

What is claimed is:

1. In a motor vehicle body having a windshield, a generally box-shaped cowl bar extending transversely of said vehicle body beneath the lower edge of said windshield and forming a hollow duct, a resilient weatherstrip between said windshield and said cowl bar, an instrument panel secured to the upper portion of said cowl bar and extending upwardly and rearwardly therefrom, a molding strip extending transversely of said vehicle body between said windshield and said instrument panel and spaced upwardly from the upper portion of said box-shaped cowl bar to form an elongated transversely extending chamber bounded by said weatherstrip, the upper portion of said box-shaped cowl bar, said instrument panel, and said molding strip, said molding strip being spaced from said weatherstrip along a portion of its length to permit air to pass therebetween, an enlarged inlet in the bottom wall of said box-section cowl bar for admitting heated defrosting air into said duct, and a series of laterally spaced relatively small outlets in the upper portion of said box-shaped cowl bar to establish communication between said duct and said chamber to permit heated defrosting air to pass from said duct to said chamber and to be distributed through the aforesaid openings between said molding strip and said weatherstrip onto the inner surface of said windshield.

2. The structure defined by claim 1 which is further characterized in that the small outlets in the upper portion of the box section cowl bar are arranged in two transversely spaced groups symmetrically located on opposite sides of the longitudinal center line of the vehicle, the outlets in each group being of maximum size adjacent the central zone of the group and progressively decreasing in size in each direction from said central zone and the spacing between adjacent outlets in each group being at a minimum adjacent the central zone of the group and progressively increasing in each direction from said central zone to distribute a greater quantity of defrosting air onto said windshield adjacent the central zones of said groups than in the side zones thereof.

3. In a motor vehicle body having a windshield, a generally horizontal cowl panel extending forwardly from the lower edge of said windshield, said cowl panel having a laterally extending inverted V-shaped portion intermediate its forward and rearward edges and terminating at its rearward edge in an upwardly and rearwardly inclined marginal flange, a generally box-shaped cowl bar extending transversely of said vehicle body and having an upwardly and rearwardly inclined rear flange secured to the marginal flange of said cowl panel and a front flange secured to the inverted V-shaped portion of said cowl panel to form therewith an enclosed hollow duct extending transversely of the vehicle body beneath said windshield and substantially coextensive in length with said windshield, a resilient weatherstrip embracing the lower edge of said windshield and engaging the marginal flange and inverted V-shaped portion of said cowl panel, an enlarged inlet opening in the lower portion of said cowl bar for admitting defrosting air into said duct, an instrument panel having a forward transversely extending flange inclined upwardly and engaging and secured to the upper wall of said box-shaped cowl bar, said instrument panel having a rearwardly and upwardly inclined intermediate portion extending rearwardly from its forward flange and a generally horizontal portion extending rearwardly from the upper portion of said intermediate portion, and a generally flat transversely extending folding strip engaging said instrument panel adjacent the junction of its intermediate and horizontal portions and extending forwardly therefrom to form substantially a continuation of the horizontal portion of said instrument panel, the forward edge of said molding strip engaging said weatherstrip along portions thereof but spaced from said weatherstrip in two transversely elongated zones symmetrically spaced on opposite sides of the longitudinal center line of the vehicle, and a series of relatively small outlet openings in the upper wall of said box-shaped cowl bar to establish communication between said duct and the chamber formed between the upper wall of said duct, the intermediate portion of the instrument panel, the weatherstrip, and the molding strip, said outlet openings being arranged in two transversely spaced groups with each group being located beneath one of the transversely elongated openings between the weatherstrip and the molding strip to direct heated defrosting air from said duct into said chamber and onto the interior surface of said windshield through said transversely elongated openings.

References Cited in the file of this patent

UNITED STATES PATENTS

| Number | Name | Date |
|---|---|---|
| 1,308,236 | Glass | July 1, 1919 |
| 2,001,878 | Johnson | May 21, 1935 |
| 2,174,816 | Bliss | Oct. 3, 1939 |
| 2,271,225 | Heffernan | Jan. 27, 1942 |
| 2,302,397 | Spackman et al. | Nov. 17, 1942 |

FOREIGN PATENTS

| Number | Country | Date |
|---|---|---|
| 62,986 | Sweden | May 17, 1927 |